Nov. 28, 1961  H. W. LINGELBACH  3,010,384
CHARCOAL BROILER

Filed Oct. 14, 1958  2 Sheets-Sheet 1

INVENTOR.
HUGO W. LINGELBACH
BY
ATTORNEY

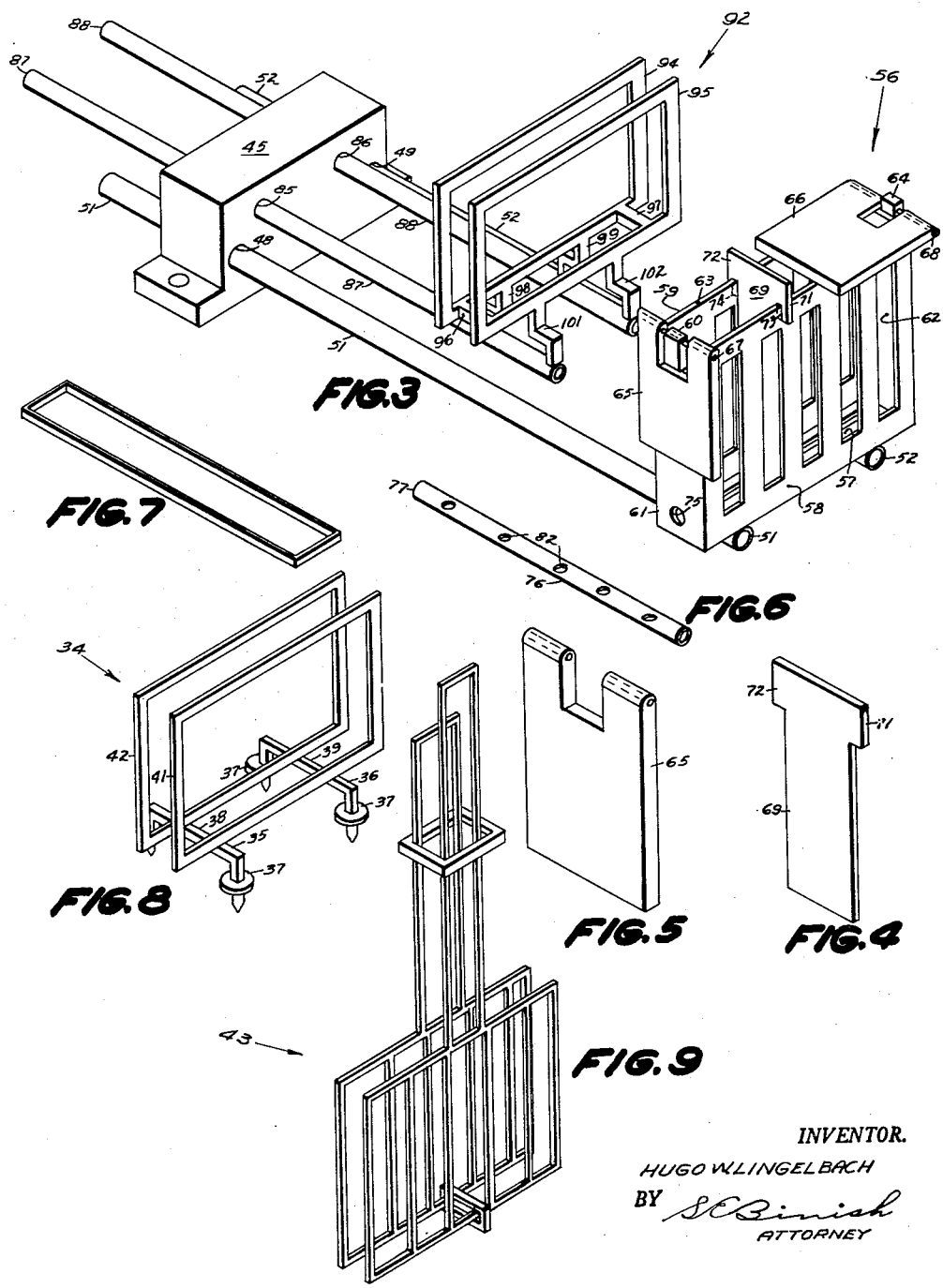

United States Patent Office 3,010,384
Patented Nov. 28, 1961

3,010,384
CHARCOAL BROILER
Hugo W. Lingelbach, 613 Main St., Oconto, Wis.
Filed Oct. 14, 1958, Ser. No. 767,227
1 Claim. (Cl. 99—390)

This invention relates to improvements in broilers, and more particularly to improvements in outdoor charcoal broilers.

The purpose of this invention is to provide an outdoor charcoal broiler of maximum utility and flexibility.

An object of this invention is the provision of a charcoal broiler apparatus of maximum flexibility in which the operative members thereof are individually movable and variably adjustable relative to each other.

Another object is to provide a charcoal broiler wherein the fire box chamber can be varied in volume.

Still another object of this invention is the provision of a charcoal broiler adapted for frying and for general cooking, as well as broiling.

Yet another object is to provide a charcoal broiler having gas kindler means.

A further object of this invention is the provision of a charcoal broiler having an overhead warmer shelf.

Still a further object is to provide a charcoal broiler adapted for the manual placement and removal of food therefrom.

Yet a further object of this invention is the provision of a charcoal broiler having drip pan means movable with the operative members of said broiler.

Another object is to provide vertically disposed broiling fire box means, whereby the meat being broiled is likewise vertically disposed adjacent said fire box means, and the grease drippings from the food do not fall into the fire box causing harmful flame flare-up.

Other specific objects, and many of the attendant advantages of this invention will be readily appreciated as the same becomes better understood by reference to the following detailed description when considered in connection with the accompanying drawings in which like reference numerals designate like parts throughout the several views thereof and wherein:

FIG. 3 is an isometric view of an important portion of the apparatus, particularly illustrating one of the fire boxes, one of the meat holder support means, and the slidable mounting means therefor;

FIG. 4 is an isometric view of a fire box divider element embodied in the apparatus;

FIG. 5 is an isometric view of a griddle element embodied in the apparatus.

FIG. 6 is an isometric view of a perforated gas igniter tube embodied in the invention;

FIG. 7 is an isometric view of a typical drip and ash pan embodied in the invention;

FIG. 8 is an isometric view of a centrally located and detachable meat holder support means embodied in the invention; and FIG. 9 is an isometric view of a typical portable meat holder embodied in the invention.

Figure 2:
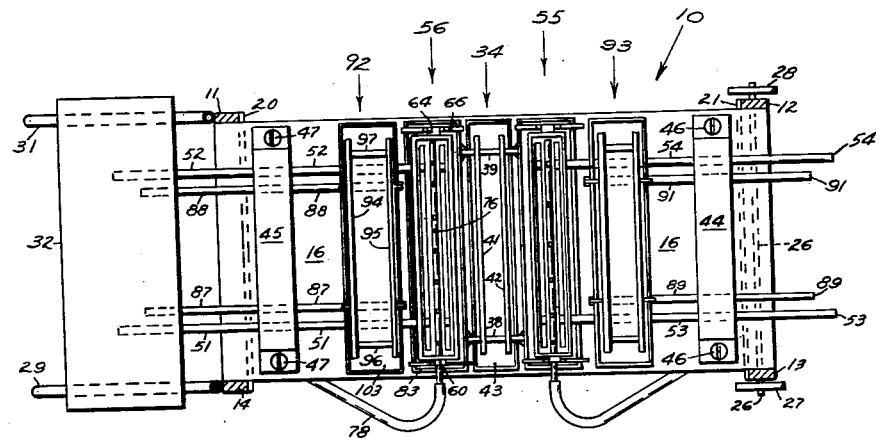
FIG. 2 is a plan view, of the apparatus shown in FIG. 1, taken along line 2—2.

Referring now to the drawings, wherein like reference characters designate like or corresponding parts throughout the several views, there is shown a wheeled stand, generally indicated at 10, comprising four upright legs 11, 12, 13 and 14, a lower storage deck 15, an intermediate support deck 16, and an upper perforated warmer deck 17, suitably fixed and supported on cross beams 18, 19, 20, 21, 22 and 23. Suitable diagonal bracing, such as at 24 and 25, is provided to effect rigidity of the stand. An axle 26, journalled across front legs 13 and 12, receives wheels 27 and 28 mounted rotatably thereon. Spaced U-shaped handles 29 and 31, having their leg elements disposed horizontally and directed against the stand legs 14 and 11, respectively, and mounted thereon, provide convenient manipulating means for the wheeled stand. Carving boards 32 and 33 are mounted across said handles.

Centrally of the support deck 16, and transversely thereof, is removably mounted an upright U-shaped meat holder support, generally indicated at 34.

Said support 34, see FIG. 8, comprises a pair of spaced, shallow but widespread inverted U-shaped members 35 and 36, disposed longitudinally along the side edges of the support deck 16. Apertures are provided in the support deck 16 to receive the leg elements of said U-shaped members 35 and 36 detachably therein.

Abutment collars, such as shown at 37, are mounted on said leg elements, intermediate the ends thereof, to space the horizontal beam or body portions, 38 and 39, respectively, of the inverted U-shaped members 35 and 36, from the support deck 16.

A pair of spaced and vertically disposed, rectangular marginal frames 41 and 42 are mounted across and on the beam portions 38 and 39 of said inverted U-shaped members 35 and 36, and secured thereto as by welding. The resulting upright U-shaped meat holder support 34, is adapted to receive a conventional meat holder, such as indicated generally at 43, see FIG. 9, upright therein.

The spacing of said marginal frames 41 and 42 is of a measure to somewhat loosely receive said meat holder 43 therein, yet is a substantially upright disposition.

Figure 1:
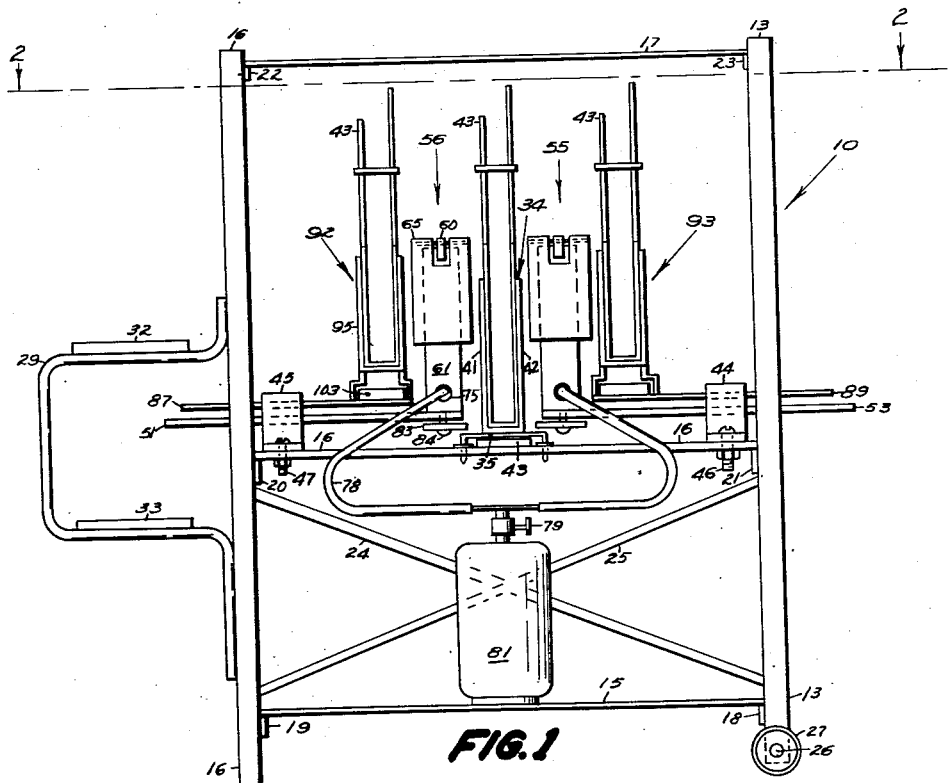
FIG. 1 is a side elevation view of the invention.

A shallow drip pan specifically shown at 43, see FIGS. 1 and 2, and generally depicted such as shown in FIG. 7, is slidably mounted on deck 16, and between the leg elements of the inverted U-shaped members 35 and 36, to receive the drippings from meat being broiled and supported in said support 34.

On the ends of said support deck 16 are mounted corresponding elongated mounting blocks 44 and 45, respectively, disposed transversely across the ends of said deck 16. Said blocks are secured to deck 16 by means of paired bolts, such as indicated at 46 and 47, respectively.

Block 45 is provided with paired, lower disposed guide bores 48 and 49 to receive support tubes 51 and 52, respectively, slidably mounted therein, see FIG. 3. Said tubes are disposed longitudinally and parallel of the deck 16.

Block 44 is likewise provided with paired, lower disposed guide bores to receive support tubes 53 and 54, respectively, slidably mounted therein. Said tubes are likewise disposed longitudinally and parallel to deck 16, and substantially at the same elevation as the opposite companion tubes 48 and 49.

Across the inner ends of said paired support tubes are vertically mounted corresponding fire boxes, generally indicated at 55 and 56, respectively. Said boxes are fixedly mounted on said tubes by any means, such as by welding.

Fire box 56, see FIG. 3, comprises a bottom grate 57, side gridirons 58 and 59, and end walls 61 and 62. The top of said fire box 56 is open and presents a horizontal rim 63 therearound.

End walls 61 and 62 are provided with upstanding mounting lugs 60 and 64, at the upper end portions of said walls, respectively.

Corresponding griddles 65 and 66 are pivotally mounted on said lugs, through means of horizontally disposed pins 67 and 68, respectively, see FIGS. 3 and 5. Said griddles are operative to pivot over the fire box opening and rest on the rim 63 thereof. In this position the griddles can be used to cook on, drawing heat from the fire box, as shown in the operative position of griddle 66, FIG. 3. When not being used, the griddles can be pivoted upwardly and outwardly and disposed in the pending inoperative position of griddle 65, FIG. 3.

A removable vertical partition 69 is provided, for installation in said fire box when only a portion of the fire box chamber is desired to be used; or when the original charge of fuel is partly consumed and one chooses to gather the remaining fuel to one side of the fire box to complete a small broiling operation, rather than fully and completely recharge the fire box and thereby waste fuel. Said portion 69 has widened ear portions 71 and 72 which are removably received in deep slots 73 and 74 in the rim portion of the fire box, for securement against displacement.

End wall 61 is provided with an aperture 75 in the lower end portion thereof, see FIG. 3, to receive a gas kindler tube 76 therethrough, said tube 76 extending into and across the fire box and resting on the bottom grate 57 thereof, see FIG. 1. The remote end 77 of the gas kindler tube is closed, see FIG. 6, and a flexible hose 78 connects the open end thereof with an adapter valve 79 which controls the flow of gas from gas filled container 81 mounted on lower storage deck 15, see FIG. 1.

The gas kindler tube 76 is provided with outlet apertures such as indicated at 82 through which flammable gas is discharged to provide a kindling medium for the charcoal fuel or the like. The burning gas flows through the entire body of combustible fuel in the fire box, and permeates all the interstices between the individual charcoal lumps, simultaneously, and causes the whole bed of fuel to be uniformly and expeditiously ignited. The result is an uniformly ignited fuel bed, as distinguished from the usual instance wherein burning commences at the bottom of the bed and works its way slowly to the top of the fuel bed.

A shallow ash pan specifically shown at 83 in FIGS. 1 and 2, and generally depicted such as shown in FIG. 7, is disposed under said fire box 56, and threadedly fixed to the tubes 51 and 52 as by means of screws such as indicated at 84. Said ash pan is carried by said tubes, moves with said fire box 56, and receives ashes dropped from said fire box.

Fire box 55 is similarly constructed, similarly provided with attachments, and similarly connected to the source of gas 81.

Obviously, said slidably mounted fire boxes can be moved toward and away from the meat holder support 34, as the broiling requirements dictate.

Block 45 is also provided with paired, upper disposed guide bores 85 and 86 to receive support tubes 87 and 88, respectively, slidably mounted therein, see FIG. 3. Said tubes are disposed longitudinally and parallel of the support deck 16.

Block 44 is likewise provided with paired, upper disposed guide bores to receive support tubes 89 and 91, respectively, slidably mounted therein. Said tubes are likewise disposed longitudinally and parallel to deck 16, and substantially at the same elevation as the opposite companion upper tubes 87 and 88.

Across the inner ends of said paired support tubes 87 and 88, 89 and 91, are vertically and fixedly mounted corresponding U-shaped meat holder supports, generally indicated at 92 and 93, respectively. Said meat holder supports are mounted on said tubes by any means, such as welding.

Meat holder support 92, see FIG. 3, comprises a pair of spaced and vertically disposed, rectangular marginal frames 94 and 95, connected by spacer members 96 and 97 across the bottoms thereof, resulting in U-shaped receiving means.

Frame 94 is provided with offset legs 98 and 99 fixedly mounted on tubes 87 and 88, respectively, by any means such as welding.

Frame 95 is provided with offset legs 101 and 102 fixedly mounted on tubes 87 and 88, respectively, by any means such as welding.

The resulting upright U-shaped meat holder support 92, is adapted to receive a conventional meat holder, such as indicated generally at 43, see FIG. 9, upright therein. The spacing of said marginal frames 94 and 95 is of a measure to somewhat loosely receive said meat holder 43 therein, yet in a substantially upright disposition.

A shallow drip pan specifically shown at 103, see FIGS. 1 and 2, and generally depicted such as shown in FIG. 7, is slidably mounted on said tubes 87 and 88, and between the paired offset legs 98, 101, and 99 and 102, to receive the drippings from meat being broiled and supported in said support 92. Said drip pan is carried by said tubes 87 and 88, and moves with said support 92.

Meat holder support 93 is similarly constructed, similarly provided with a drip pan, and similarly mounted on companion tubes 89 and 91.

Obviously, said slidably mounted meat holder supports 92 and 93 can be moved toward and away from their respective fire boxes 56 and 55, as the broiling requirements dictate.

Maximum flexible control is achieved with the above described arrangement of members, in that the fire boxes 55 and 56 can be independently moved and adjusted toward and away from fixed meat holder support 34, as desired; and meat holder supports 92 and 93 can be independently moved and adjusted toward and away from their respective fire boxes 56 and 55, as desired.

Fixed meat holder support 34 is made removable to accommodate the use of a rotatable spit between the fire boxes 56 and 55 if desired.

The upper perforated warmer deck 17 is useable for the temporary storage of food thereon to be kept warm from the excess heat rising from the fire boxes.

Operation: The stand can be manipulated from place to place by grasping the handle members 29 and 31, lifting the rear legs 11 and 14 off the ground, and moving the stand on its forward wheels.

Fuels, such as charcoal is loaded in the fire boxes, and kindled by means of the flammable gas in the container 81. When the fuel beds are thoroughly ignited the gas is shut off by means of control valve 79.

Meat, such as steaks are secured in the meat holders 43, and then disposed upright in the meat holder supports 34, 92 and 93, respectively. The steak in the fixed meat holder support 34 is being broiled on both sides, simultaneously, by the fire boxes 55 and 56. Meat in the movable meat holder supports 92 and 93, is broiled on one side only. The meat holders 43 need only be manually reversed in their supports to broil the remaining sides of the steaks. The proximity of the steaks to the fire boxes can be simply controlled by simply moving the slidably mounted fire boxes and/or the slidably mounted supports 92 and 93, as desired, through means of the actuable drive tubes.

In the event cooking other than broiling is desired, such as the cooking of coffee or frying, the griddles such as indicated at 65 and 66 can be operatively disposed over the fire boxes, and the excess heat used therefrom to heat said griddles.

In the event the volume of the fire box chamber is desired to be reduced, the partition 69 may be inserted in the fire boxes and the fire bed controlled accordingly.

In the event a rotatable spit means is desired to be used in conjunction with this charcoal broiler, the fixed meat holder support 34 can be easily removed by lifting it out of its receiving apertures in the deck 16, and such rotatable spit means disposed between the fire boxes, in lieu of said fixed meat holder support.

The characteristic features of this invention are the provision of a charcoal broiler having two slidably mounted fire boxes interposed between a battery of three meat holder supports, a central one of which is fixed and the two others being slidably mounted, to achieve maximum flexibility of adjustment of said members in relation to each other; the provision of gas kindler means in a broiler fire box; the provision of a removable partition in a broiler fire box; the provision of pivotal griddle means operatively associated with fire box broiler means; the provision of space means on said broiler adapted for the mounting of rotatable spit means; and the provision of handle means supporting carving boards.

Should it be desired, the charcoal broiler arrangement can be modified by removing the removable meat holder support 34, and further removing one of the fire boxes, say fire box 55. With fire box 56 extended approximately centrally of deck 16, meat holder supports 92 and 93 can be operatively associated therewith, and said meat holder supports 92 and 93 can be moved toward and away from said fire box 56 as a modified broiler arrangement.

What is claimed and desired to be protected by Letters Patent of the United States is:

A charcoal broiler, comprising: a support deck; oppositely disposed and spaced block means mounted on said deck; first U-shaped in cross-section meat holder support means mounted upright on said support deck intermediate said block means; first guide bore means in each of said block means axially directed toward said first U-shaped meat holder support means; first substantially straight support tube means slidably mounted in each of said first guide bore means, said slidable support tube means extending from an inner point inwardly of said block means and adjacent said first meat holder support means to an outer point substantially beyond said block means the outer portion of said first support tube means comprising handle means for manipulating said first support tube means to and fro in said first guide means; vertically disposed fire box means fixedly mounted on the inner end of each of said first slidable support tube means, first slidable support tube means and fire box means fixed thereon being positionally controlled through means of said actuable slidable support tube means and operative to cause said fire box means to be moved toward and away from said first U-shaped meat holder support means; second guide bore means in each of said block means axially directed toward said fire box means, respectively; second substantially straight support tube means slidably mounted in each of said second guide bore means, said second support tube means extending from an inner point adjacent the respective fire box means to an outer point substantially beyond said block means, the outer portion of said second support tube means comprising handle means for manipulating said second support tube means to and fro in said second guide means; and second U-shaped in cross-section meat holder support means fixedly mounted upright on the inner end of each of said second slidable support tube means.

References Cited in the file of this patent

UNITED STATES PATENTS

| | | |
|---|---|---|
| 151,508 | Peckover | June 2, 1874 |
| 164,269 | Cook | June 8, 1875 |
| 293,973 | Mattice | Feb. 19, 1884 |
| 707,243 | Leonard | Aug. 19, 1902 |
| 1,389,776 | Mueller | Sept. 6, 1921 |
| 1,398,157 | Segar | Nov. 22, 1921 |
| 1,610,370 | Guy-Pell | Dec. 14, 1926 |
| 1,614,785 | Fraser | Jan. 18, 1927 |
| 1,656,181 | Elbert | Jan. 17, 1928 |
| 1,731,743 | Harrison | Oct. 15, 1929 |
| 1,778,330 | Mayer | Oct. 14, 1930 |
| 1,842,227 | Wirth | Jan. 19, 1932 |
| 1,997,192 | Kasamis | Apr. 9, 1935 |
| 2,069,824 | Engel et al. | Feb. 9, 1937 |
| 2,314,772 | Corra | Mar. 23, 1943 |
| 2,335,217 | Tate | Nov. 23, 1943 |
| 2,501,104 | Smith | Mar. 21, 1950 |
| 2,600,234 | Foley | June 10, 1952 |
| 2,726,318 | Marschke | Dec. 6, 1955 |
| 2,780,474 | Farah et al. | Feb. 5, 1957 |
| 2,790,434 | Del Francia | Apr. 30, 1957 |
| 2,797,633 | Goodwin | July 2, 1957 |
| 2,821,187 | Tescula | Jan. 28, 1958 |
| 2,923,229 | Halford | Feb. 2, 1960 |
| 2,946,275 | Compton | July 26, 1960 |

FOREIGN PATENTS

| | | |
|---|---|---|
| 391 | Great Britain | Jan. 9, 1886 |
| 4,388 | Great Britain | 1909 |
| 10,093 | Netherlands | Dec. 15, 1923 |
| 179,366 | Austria | Aug. 25, 1954 |